United States Patent [19]

Akiyama

[11] Patent Number: 5,063,345
[45] Date of Patent: Nov. 5, 1991

[54] APPARATUS FOR DETERMINING A ROTATIONAL SPEED OF A VEHICLE WHEEL

[75] Inventor: Takeo Akiyama, Tokyo, Japan
[73] Assignee: Nissan Motor Co., Ltd., Yokohama, Japan
[21] Appl. No.: 583,275
[22] Filed: Sep. 17, 1990
[30] Foreign Application Priority Data
Oct. 19, 1989 [JP] Japan ................. 1-272319
[51] Int. Cl.⁵ ............................. G01P 3/48
[52] U.S. Cl. ................................ 324/173
[58] Field of Search ............ 324/166, 173-175, 324/207.11, 207.13, 207.14, 207.15, 207.16, 207.12, 225, 239; 188/181 R; 310/155, 168; 73/661

[56] References Cited

U.S. PATENT DOCUMENTS

| | | | |
|---|---|---|---|
| 3,680,379 | 8/1972 | Boyd et al. | 324/174 X |
| 3,719,841 | 3/1973 | Ritsema | 324/174 X |
| 3,732,494 | 5/1973 | Dragon | 324/174 |
| 4,268,771 | 5/1981 | Lall | 324/207.15 X |
| 4,419,646 | 12/1983 | Hermle | 324/207.15 X |
| 4,502,853 | 3/1985 | Ohi | 324/174 X |
| 4,595,897 | 6/1986 | Amano et al. | 324/174 X |
| 4,647,892 | 3/1987 | Hewitt | 324/207.15 X |
| 4,652,818 | 3/1987 | Buchschmid et al. | 324/174 |

FOREIGN PATENT DOCUMENTS 63-39677  3/1988  Japan .

Primary Examiner—Kenneth A. Wieder
Assistant Examiner—Warren S. Edmonds
Attorney, Agent, or Firm—Lowe, Price, LeBlanc & Becker

[57] ABSTRACT

A wheel speed sensor apparatus for detecting the rotational speed of a road wheel of an automotive vehicle. The apparatus includes a toothed rotor rotatable with a road wheel of the vehicle. A sensor main body contains an element which produces an electical signal in response to adjacent passage of the rotor teeth upon rotation of the sensor rotor. The sensor main body is fitted inside inside a metallic sleeve in a manner such that a tip end section of the sensor main body is in close proximity to the sensor rotor. The metallic sleeve is fitted in the installation hole. The installation member is made of aluminum or aluminum alloy and is connected with the base section of a suspension strut of the vehicle.

12 Claims, 3 Drawing Sheets 5,063,345

APPARATUS FOR DETERMINING A ROTATIONAL SPEED OF A VEHICLE WHEEL

BACKGROUND OF THE INVENTION

1. Field of the Invention

This invention relates to improvements in a wheel speed sensor arrangement, and more particularly to an installation configuration of a wheel speed sensor for an automotive vehicle.

2. Description of the Prior Art

A wheel speed sensor for detecting the rotational speed of a road wheel of an automotive vehicle has been proposed as shown, for example, in Japanese Utility Model Provisional Publication No. 63-39677. This wheel speed sensor will be discussed with reference to FIG. 4 of the present application. The wheel speed sensor includes a sensor main body (magnetic pickup) 4 which is positioned in close proximity to the teeth 2a of a serrated sensor rotor (impulse ring) 2. The wheel speed sensor 4 is adapted to magnetically detect rotation of the sensor rotor 2.

The sensor main body 4 is fitted in an installation hole 6A of an installation member 6 under a so-called clearance fitting. The installation member 6 is, for example, fixedly connected to the base section of a suspension strut. The cylindrical section of the sensor main body 4 is usually made of stainless steel taking corrosion resistance into consideration, while installation member 6 is made of aluminum or aluminum alloy taking weight into consideration.

However, drawbacks have encountered in such a conventional arrangement of the wheel speed sensor, in which the aluminum-made installation member corrodes for the following reasons: aluminum has a much smaller electro-chemical potential (electromotive force) than stainless steel so that electrocorrosion or galvanic corrosion occurs in the aluminum it is in contact with the stainless steel under humid conditions during prolonged use. Simultaneously a natural corrosion or oxidation occurs in the aluminum. Such corrosions produce oxidation of aluminum as indicated by the reference character K in FIG. 4. The oxide K will press and crush (deform) the outer surface of the cylindrical section 4A of the sensor main body 4, thereby wrecking a magnetic pickup mechanism contained in the cylindrical section 4A.

SUMMARY OF THE INVENTION

It is an object of the present invention to provide an improved wheel speed sensor arrangement which can overcome the drawbacks encounted in a conventional similar arrangement.

Another object of the present invention is to provide an improved wheel speed sensor arrangement which effectively prevents damage of an installation member for a sensor main body due to production of corrosion while, maintaining a light-weight configuration of the installation member.

A further object of the present invention is to provide an improved wheel speed sensor arrangement in which corrosion of an installation member for a sensor main body is effectively prevented, thereby protecting the installation member at a part contacting with a sensor main body from production of corrosion byproducts.

A wheel speed sensor arrangement of the present invention is comprised of a sensor rotor rotatable with a road wheel of a vehicle. A sensor main body is provided to produce a signal in response to a rotation of the sensor rotor. The sensor main body is fitted inside a metallic sleeve in such a manner that a tip end section of the sensor body is in close proximity to the sensor rotor. The metallic sleeve is fitted in the installation hole of an installation member. The metallic sleeve is plated at its outer surface with zinc to form a zinc film which is in direct contact with the inner surface of the installation hole. The installation member is made of a material the major component of which is aluminum and is connected with a vehicle body.

Since the metallic sleeve is plated with zinc, which is lower in potential (electromotive force) than is aluminum, corrosion of the aluminum-made installation member is prevented. The corrosion prevention is further promoted by obstructing penetration of water into between the metallic sleeve and the installation member under the effect of tight fitting of the metallic sleeve in the installation hole. Even if the corrosion occurs, the sensor main body is protected from crushing or deformation by virtue of insertion of a rigid metallic sleeve between the sensor body and the installation member, thereby improving the durability of the wheel speed sensor.

DETAILED DESCRIPTION OF THE INVENTION

Figure 1:
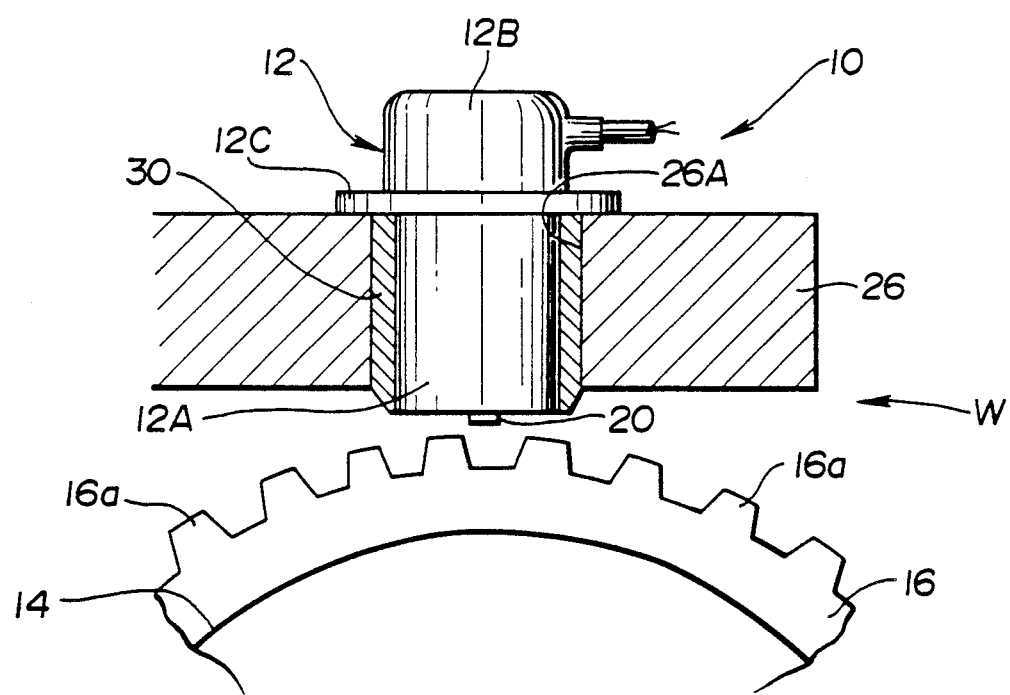
FIG. 1 is a side view, partly in section, of an embodiment of a wheel speed sensor arrangement according to the present invention.
Figure 2:
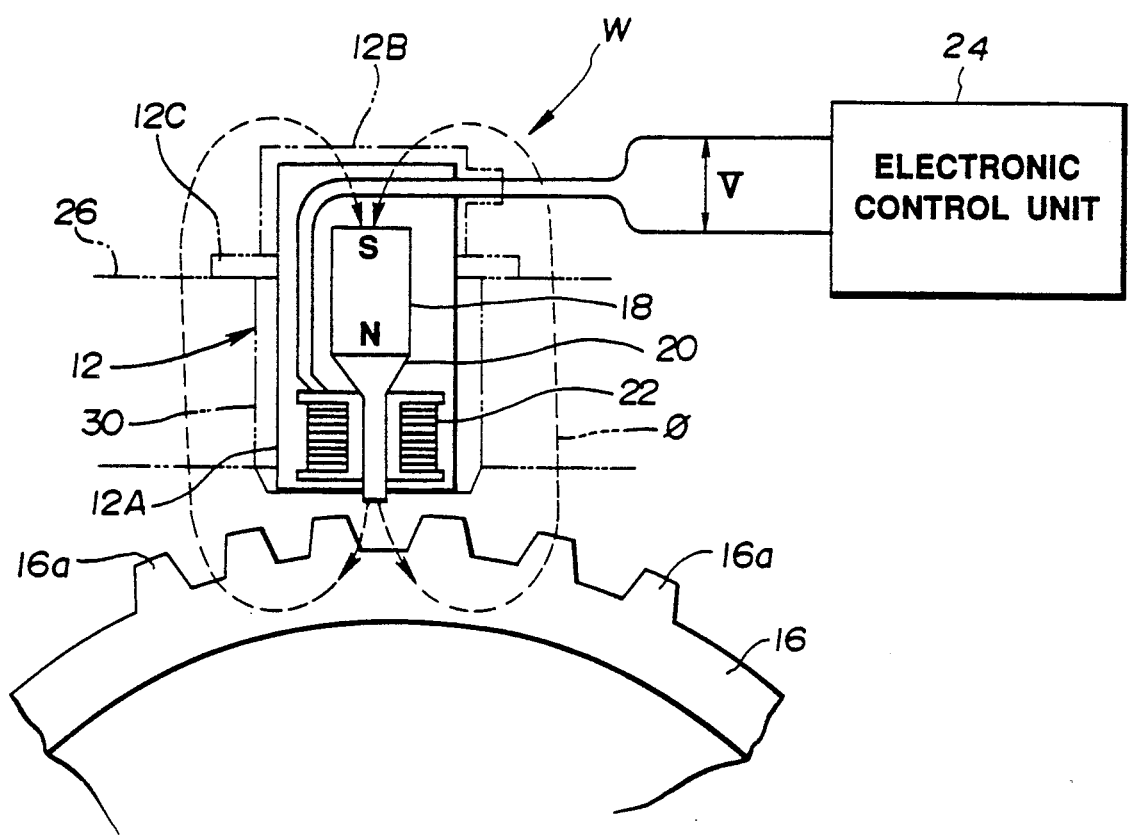
FIG. 2 is a schematic side view similar to FIG. 1 but showing a magnetic pickup mechanism of a sensor main body of the wheel speed sensor arrangement of FIG. 1.
Figure 3:
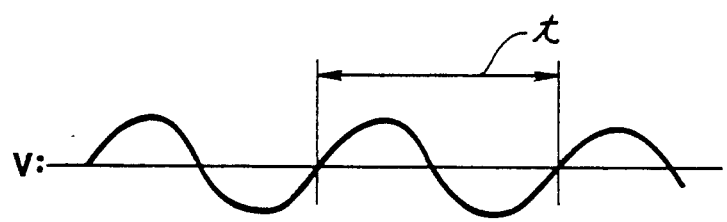
FIG. 3 is a wave-form chart showing a detection signal generated by the sensor of FIG. 2.

Referring now to FIGS. 1 to 3, a preferred embodiment of a wheel speed sensor arrangement is illustrated by the reference character W. In this embodiment, the wheel speed sensor arrangement W is for an automotive vehicle and comprises a wheel speed sensor 10 which is adapted to detect the rotational speed of a road wheel (not shown) of the vehicle, e.g., in order to control an antiskid braking system and/or a four-wheel driving system.

The wheel speed sensor 10 includes a sensor main body 12 constituting a magnetic pickup. The sensor main body 12 is associated with a senor rotor or impulse ring 16 which is fixedly mounted on axle 14 connected to the road wheel. As shown in FIG. 2, the sensor main body 12 includes a cylindrical cover section 12A made of stainless steel. A permanent magnet 18 is fixedly disposed inside the cylindrical cover section 12A and located so that the south pole (S) is positioned farther from the sensor rotor 16 than the north pole (N). A rod 20 made of soft iron is connected with the permanent magnet 18 at the north pole (N) thereof, and extends toward the sensor rotor 16 in order to positively introduce lines of magnetic force ($\phi$) from the permanent magnet 18 toward the sensor rotor 16. A coil 22 serving as a pickup section is disposed around the soft iron rod 20. The coil 22 is electrically connected to an electronic control unit 24. The reference numeral 12B denotes a cap housing secured to the top of the cylindrical cover section 12A and provided with a flange section 12B.

The sensor rotor 16 is provided at its outer peripheral surface with teeth 16a which are spaced apart at intervals of a predetermined distance. Each tooth 16a is adapted to pass through the magnetic field formed by the magnetic force lines ($\phi$) at a speed proportional to the rotational speed of the road wheel. It will be understood that the magnetic field in the vicinity of the tip end section (near the sensor rotor 16) of the sensor main body 12 experiences a deformation in response to each tooth 16a coming near the tip end section of the sensor main body 12, in which the continuous change in the magnetic field is shaped generally as a sine wave. Such a change in the magnetic field is detected as a sine wave voltage signal (induced electromotive force) V shown in FIG. 3. In FIG. 3, the character t indicates a time duration in which one serration tooth 16a of the sensor rotor 16 passes the sensor. This voltage signal V is transmitted to the electronic control unit 24 to be suitably treated.

The wheel speed sensor 10 is supported by an installation member 26 made of aluminum or aluminum alloy. One end section of the installation member 26 is fixedly secured at its end to the base section of a suspension strut (not shown), while another end section extends to a position near the sensor rotor 16. The installation member 26 is formed at its predetermined position with a circular installation hole 26A having a predetermined diameter. The cylindrical sleeve 30 is fixedly and tightly fitted in the installation hole 26A, and the the cylinder 12A of the sensor main body 12 is fixedly fitted inside the cylindrical sleeve 30. Such a configuration is assembled as follows: the cylindrical sleeve 30 is press-fitted in the installation hole 26A of the installation member 26. Thereafter, the cylinder 12A of the sensor main body 12 is inserted inside the cylindrical sleeve 30 under a so-called clearance fitting or the like. The cylindrical sleeve 30 is formed of iron and plated at its outer surface with zinc to form a zinc film or layer which is in direct contact with the inner surface of the installation member 26 defining the installation hole 26A.

The operation and the advantageous effects of the wheel speed sensor arrangement of the embodiment will be discussed hereinafter.

When the road wheel rotates, the sensor rotor 16 rotates in relation to the road wheel rotation. At this time, the magnetic field formed by the permanent magnet 18 of the sensor main body 12 is deformed under the effect of the each tooth 16a passing through the magnetic field. Accordingly, the coil 22 produces the sine wave voltage signal V having a frequency corresponding to the rotational speed of the road wheel. The sine wave voltage signal V is supplied to the electronic control unit 24, in which the input sine wave voltage signal V is converted to a pulse signal by a waveform shaping circuit of known kind (not shown) included in the control unit 24. The number of pulses of the pulse signal per a selected time unit is counted thereby to produce a signal representative of the rotational speed of the road wheel. This signal is supplied to a control circuit (not shown) for controlling the antiskid braking system or the like.

According to this embodiment, since the installation member 26 is made of aluminum or aluminum alloy, a weight-lightening of the wheel speed sensor arrangement W is achieved. Additionally, the cylinder 12A of the sensor main body 12 is made of stainless steel, and therefore the sensor main body 12 is protected from becoming rusty due to oxidation.

Furthermore, according to this embodiment, the cylindrical sleeve 30 is tightly fitted in the installation hole 26A, so that water hardly penetrates into a clearance between the outer surface of the sleeve 30 and the wall surface of the installation member 26 defining the installation hole 26A. Besides, the aluminum-made installation member 26 contacts only with the zinc-plated outer surface of the sleeve 30. It will be understood that the difference in the electrochemical potential or electromotive force of zinc relative to aluminum is lower than that of stainless steel relative to aluminum (as in the conventional arrangement shown in FIG. 4). Consequently, the corrosion of the aluminum-made installation member 26 in this embodiment is less than that in the conventional arrangement in which the stainless steel-made cylindrical section of the sensor main body is in direct contact with the aluminum-made installation member. Moreover, the cylindrical sleeve 30 is made of iron and accordingly is high in rigidity, thereby effectively protecting the sensor main body 12 from crushing or deformation. In this connection, even if some electrocorrosion occurs in the aluminum-made installation member 26, the cylindrical sleeve 30 can protect the cylindrical cover section 12A of the sensor main body 12 from rust caused by the electrocorrosion, oxidation or the like, thus securely preventing the cylindrical cover section 12A of the sensor main body 12 from collapsing. This greatly impoves the durability of the wheel speed sensor 10.

This embodiment is configured such that a part through which the lines of magnetic force pass in a high density is formed of the iron-made sleeve 30 which is high in electrical conductivity, so that any eddy current generated in the wheel speed sensor arrangement W is noticeably reduced as a whole. As a result, the output (the sine wave voltage signal V) of the sensor 10 is higher, thereby improving the detection accuracy of the rotational speed of the road wheel.

Figure 4:
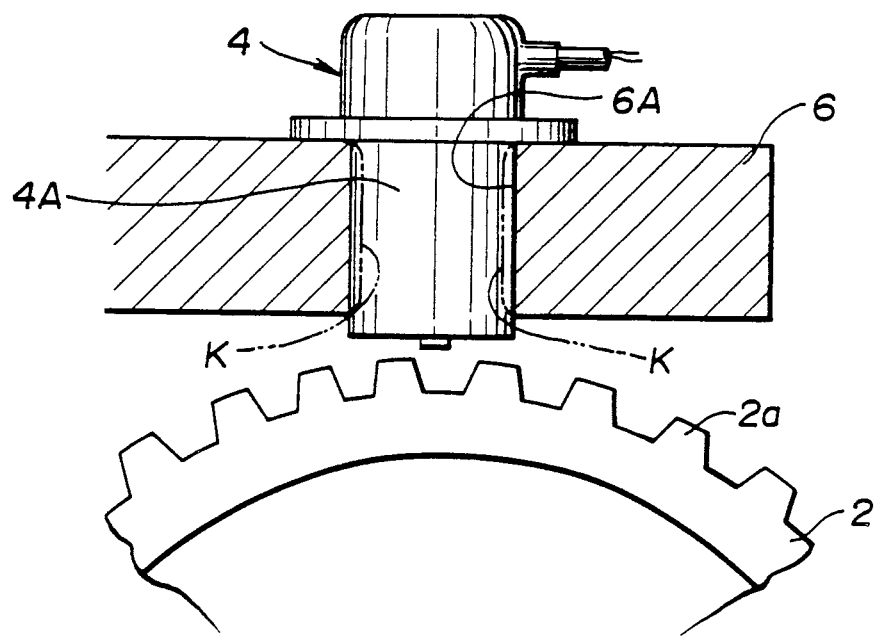
FIG. 4 is a side view similar to FIG. 1 but showing a conventional wheel speed sensor arrangement.

In this connection, with the conventional arrangement of FIG. 4, the aluminum-made installation member is lower in electrical conductivity, and therefore an eddy current tends to be generated when the lines of magnetic force pass through the installation member. This eddy current unavoidably lowers the density of the lines of magnetic force, thereby degrading a sensor output and therefore the detection accuracy. It will be understood that the magnetic flux density becomes higher as the tooth location is nearer to the permanent magnet 18 or to the cylindrical cover section 12A. so that such an eddy current largely affects the magnetic force lines.

While the cylindrical sleeve 30 has been described as being inserted into the installation hole 26A of the installation member 26 by being press-fitted, it will be appreciated that the cylindrical sleeve 30 may be inserted into the installation hole 26A by being fittingly engaged.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A corrosion-resistant arrangement for mounting a wheel speed sensor for determining a rotational speed of a wheel of a vehicle, comprising:

a sensor rotor rotatable with a road wheel of the vehicle;

an installation member made of a material comprising aluminum as a major component and formed with an installation hole, said installation member being connected with the body of the vehicle;

a metallic sleeve fitted in the installation hole of said installation member, said metallic sleeve being plated at an outer surface with zinc to form a corrosion-resistant zinc film thereat, said zinc film being in direct contact with an inner surface of the installation hole; and a sensor main body comprising means for producing a signal in response to a rotation of said sensor rotor, said sensor main body having a tip section and a cylindrical cover section and being fitted inside said metallic sleeve in such a manner that the tip end section is located in close proximity to said sensor rotor.

2. A wheel speed sensor arrangement as claimed in claim 1, wherein:

said metallic sleeve is made of iron.

3. A wheel speed sensor arrangement as claimed in claim 1, wherein:

said signal producing means of said sensor main body includes a magnetic pickup mechanism disposed in said sensor main body cylindrical cover section, said magnetic pickup mechanism including means for generating a magnetic field covering a part of said sensor rotor, and means for sensing a change in the magnetic field in correspondence with rotation of the sensor rotor.

4. A wheel speed sensor arrangement as claimed in claim 3, wherein:

said sensor rotor is provided at its periphery with teeth which pass through the magnetic field, said sensor rotor being mounted on an axle connected to rotate with the corresponding road wheel.

5. A wheel speed sensor arrangement as claimed in claim 1, wherein:

said installation member has a first end section connected to a suspension strut of the vehicle, and a second end section extending near said sensor rotor and formed with said installation hole.

6. A wheel speed sensor arrangement as claimed in claim 3, wherein:

said magnetic field change sensing means includes means for sensing a change in the magnetic field as a sine wave voltage signal.

7. A wheel speed sensor arrangement as claimed in claim 1, wherein:

said metallic sleeve is press-fitted into said installation hole.

8. A wheel speed sensor arrangement as claimed in claim 1, wherein:

said cylindrical cover section is made of stainless steel.

9. A corrosion-resistant mounting for a light-weight vehicle speed sensor mechanism having a generally cylindrical outer body shape, the mechanism during use being disposed close to a rotating wheel of the vehicle in a corrosion-causing environment, the mounting comprising:

an installation member made of a material comprising aluminum, mounted to the vehicle body and having a hole formed to receive the mechanism for mounting thereof;

a cylindrical metallic sleeve shaped and sized to fit around the generally cylindrical body of the sensor mechanism; and a zinc film plated to an outer surface of the metallic sleeve, the sensor mechanism being fitted inside the zinc-plated metallic sleeve and the metallic sleeve being inserted into the hole of the aluminum containing installation member to sense rotation of a wheel of the vehicle, the zinc film acting to protect the mechanism by preventing corrosion of the aluminum-containing body.

10. A corrosion-resistant mounting according to claim 9, wherein:

the metallic sleeve comprises iron.

11. A corrosion-resistant mounting according to claim 9, wherein:

the speed sensor mechanism comprises a cover element formed of stainless steel, said cover element being attached to the aluminum-containing installation member.

12. A corrosion-resistent mounting according to claim 10, wherein:

the speed sensor mechanism comprises a cover element formed of stainless steel, said cover element being attached to the aluminum-containing installation member.

* * * * *